(12) United States Patent
Liao et al.

(10) Patent No.: US 11,889,410 B2
(45) Date of Patent: Jan. 30, 2024

(54) NETWORK DISCOVERY, SELECTION, AND ACCESS CONTROL IN VERTICAL DOMAIN

(71) Applicant: Apple Inc., Cupertino, CA (US)

(72) Inventors: Ching-Yu Liao, Portland, OR (US); Puneet Jain, Hillsboro, OR (US); Alexandre Saso Stojanovski, Paris (FR); Meghashree Dattatri Kedalagudde, Portland, OR (US)

(73) Assignee: Apple Inc., Cupertino, CA (US)

( * ) Notice: Subject to any disclaimer, the term of this patent is extended or adjusted under 35 U.S.C. 154(b) by 383 days.

(21) Appl. No.: 17/267,845

(22) PCT Filed: Aug. 14, 2019

(86) PCT No.: PCT/US2019/046581
§ 371 (c)(1),
(2) Date: Feb. 11, 2021

(87) PCT Pub. No.: WO2020/037086
PCT Pub. Date: Feb. 20, 2020

(65) Prior Publication Data
US 2021/0219226 A1    Jul. 15, 2021

Related U.S. Application Data

(60) Provisional application No. 62/718,839, filed on Aug. 14, 2018.

(51) Int. Cl.
*H04W 48/18* (2009.01)
*H04W 76/11* (2018.01)
(Continued)

(52) U.S. Cl.
CPC ........... *H04W 48/18* (2013.01); *H04W 48/16* (2013.01); *H04W 76/11* (2018.02); *H04W 84/042* (2013.01)

(58) Field of Classification Search
CPC ..... H04W 48/18; H04W 48/16; H04W 76/11; H04W 84/042
See application file for complete search history.

(56) References Cited

U.S. PATENT DOCUMENTS 8,654,750 B2    2/2014  Wang et al.
8,942,221 B2    1/2015  Mccann et al.
(Continued)

FOREIGN PATENT DOCUMENTS

WO    2013/177182 A1    11/2013
WO    2017/014579 A1    1/2017
WO    2017140341 A1    8/2017

OTHER PUBLICATIONS

International Search Report dated Dec. 2, 2019 for International Application No. PCT/US2019/046581.
(Continued)

*Primary Examiner* — Diane D Mizrahi
(74) *Attorney, Agent, or Firm* — Eschweiler & Potashnik, LLC

(57) ABSTRACT

In one embodiment, an apparatus of a User Equipment (UE) device includes memory storing non-public network (NPN) configuration information, a radio frequency (RF) interface, and processing circuitry coupled to the memory and the RF interface. The RF interface receives information broadcast by a radio access network (RAN) node of the particular NPN, where the information includes a NPN indicator indicating that the RAN node supports a NPN and NPN service information indicating services supported by the particular NPN. The processing circuitry establishes, in response to detecting the NPN indicator in the information received from the RAN node, a connection to the particular NPN based on the NPN configuration information and the NPN service information received from the RAN node.

20 Claims, 6 Drawing Sheets

(51) Int. Cl.
*H04W 48/16* (2009.01)
*H04W 84/04* (2009.01)

(56) References Cited

U.S. PATENT DOCUMENTS

| | | | |
|---|---|---|---|
| 2008/0125043 A1* | 5/2008 | Karmanenko | H04W 12/106 455/41.2 |
| 2013/0072161 A1 | 3/2013 | Wang et al. | |
| 2015/0282042 A1 | 10/2015 | Griot et al. | |
| 2016/0044591 A1 | 2/2016 | Pao et al. | |
| 2022/0338087 A1* | 10/2022 | Uchino | H04W 36/26 |

OTHER PUBLICATIONS

"Extended European Search Report for European Patent Application No. 19850548.9", dated Feb. 25, 2022, 15 Pages.

"3rd Generation Partnership Project; Technical Specification Group Services and System Aspects; Study on the security aspects of the next generation system", In 3GPP TR 33.899, Aug. 21, 2017, 605 Pages.

* cited by examiner

NETWORK DISCOVERY, SELECTION, AND ACCESS CONTROL IN VERTICAL DOMAIN

CROSS REFERENCE TO RELATED APPLICATIONS

This application is a National Phase entry application of International Patent Application No. PCT/US2019/046581 filed Aug. 14, 2019, which claims priority to U.S. Provisional Patent Application No. 62/718,839 entitled "Network Discovery, Selection, and Access Control in Vertical Domain" and filed Aug. 14, 2018, and is hereby incorporated by reference in its entirety.

TECHNICAL FIELD

This disclosure generally relates to network discovery, selection, and access control in the field of wireless communications.

BACKGROUND

Current wireless communication networks, such as third generation (3G) and fourth generation (4G) networks, have little to no support for enhanced Vertical and local area network (LAN) services. Mechanisms are needed to provide enhanced Vertical and LAN services in upcoming fifth generation (5G) wireless communication networks.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and processes are omitted so as not to obscure the description of the various embodiments with unnecessary detail. For the purposes of the present document, the phrase "A or B" means (A), (B), or (A and B).

Figure 1:
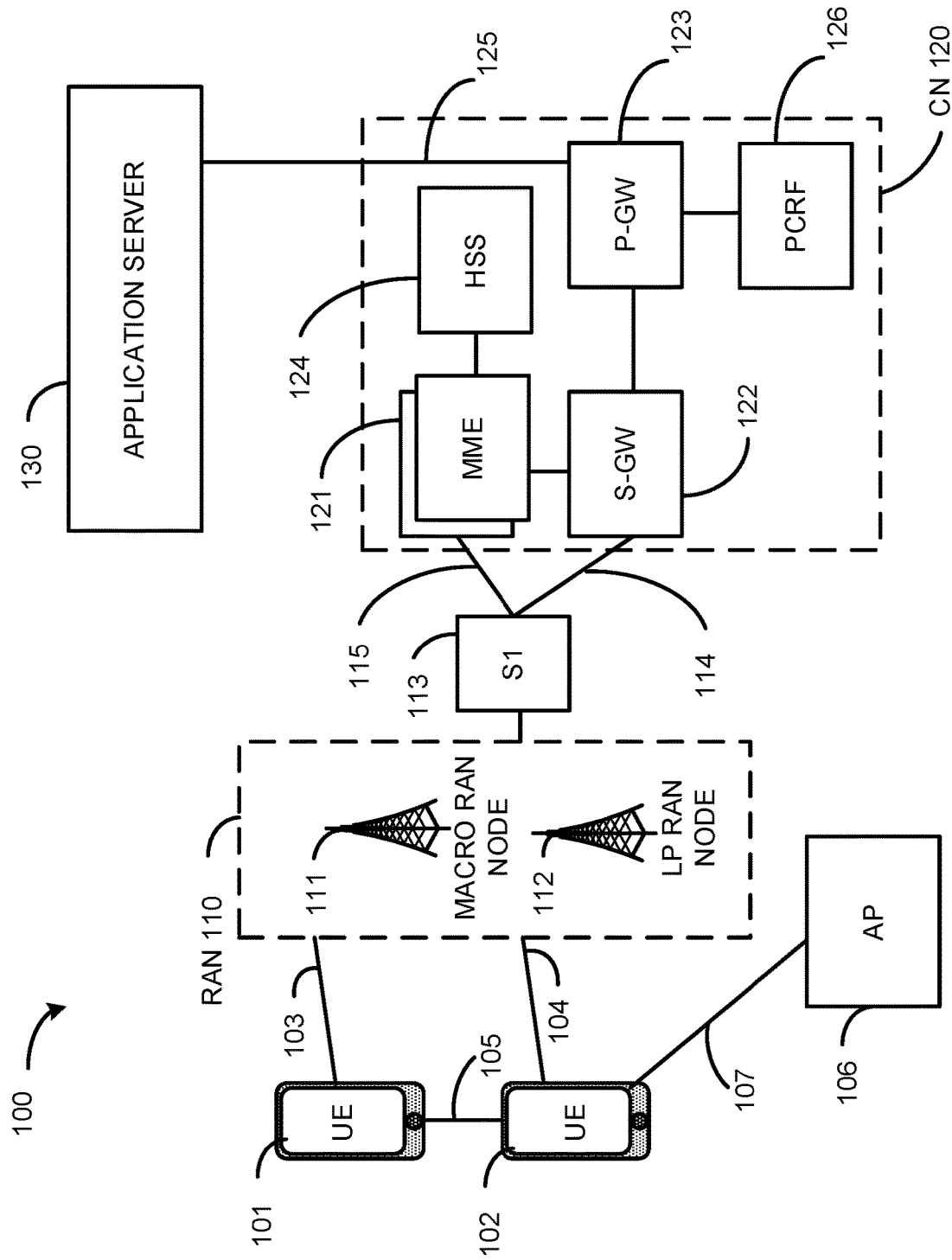
FIG. 1 illustrates an architecture of a system of a network in accordance with some embodiments.

FIG. 1 illustrates an architecture of a system 100 of a network in accordance with some embodiments. The system 100 is shown to include a user equipment (UE) 101 and a UE 102. The UEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110 The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols.

In this embodiment, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol.

The RAN 110 can include one or more access nodes that enable the connections 103 and 104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

The RAN 110 is shown to be communicatively coupled to a core network (CN) 120—via an S1 interface 113. In embodiments, the CN 120 may be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124.

Figure 2:
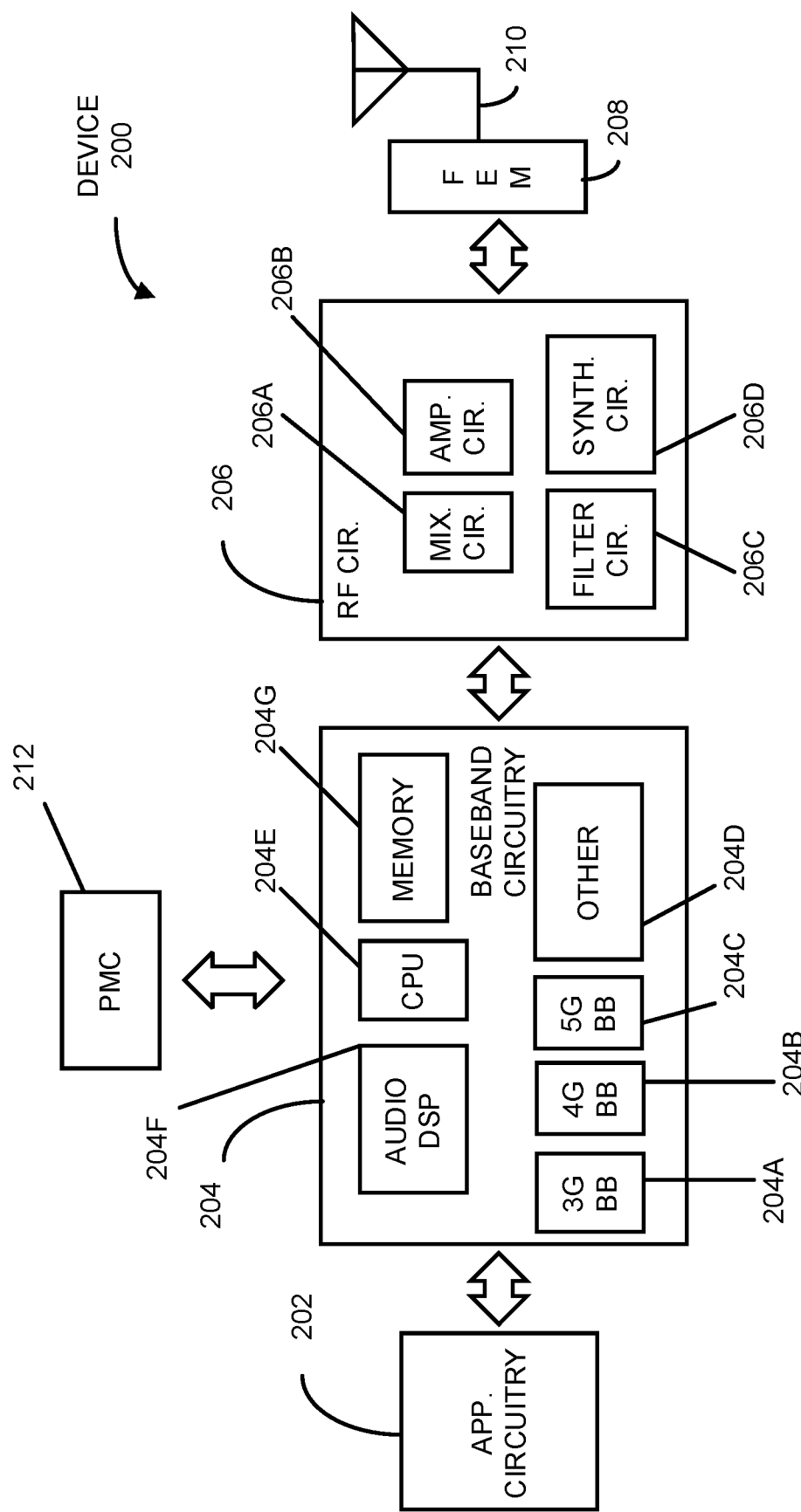
FIG. 2 illustrates example components of a device in accordance with some embodiments.

FIG. 2 illustrates example components of a device 200 in accordance with some embodiments. In some embodiments, the device 200 may include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 may be included in a UE or a RAN node. In some embodiments, the device 200 may include less elements (e.g., a RAN node may not utilize application circuitry 202, and instead include a processor/controller to process IP data received from an EPC). In some embodiments, the device 200 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 202 may include one or more application processors. The baseband circuitry 204 may include circuitry such as, but not limited to, one or more single-core or multi-core processors. The baseband circuitry 204 may include one or more baseband processors or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some embodiments, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) may handle various radio control functions that enable communication with one or more radio networks via the RF circuitry 206. In other embodiments, some or all of the functionality of baseband processors 204A-D may be included in modules stored in the memory 204G and executed via a Central Processing Unit (CPU) 204E. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, or constellation mapping/demapping functionality. In some embodiments, encoding/decoding circuitry of the baseband circuitry 204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include one or more audio digital signal processor(s) (DSP) 204F. The audio DSP(s) 204F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

RF circuitry 206 may enable communication with wireless networks using modulated electromagnetic radiation through a non-solid medium. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the receive signal path of the RF circuitry 206 may include mixer circuitry 206a, amplifier circuitry 206b and filter circuitry 206c. In some embodiments, the transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be a low-pass filter (LPF) or band-pass filter (BPF) configured to remove unwanted signals from the down-converted signals to generate output baseband signals. Output baseband signals may be provided to the baseband circuitry 204 for further processing.

In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider.

Synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210. In various embodiments, the amplification through the transmit or receive signal paths may be done solely in the RF circuitry 206, solely in the FEM 208, or in both the RF circuitry 206 and the FEM 208.

In some embodiments, the FEM circuitry 208 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 may manage power provided to the baseband circuitry 204.

Processors of the application circuitry 202 and processors of the baseband circuitry 204 may be used to execute elements of one or more instances of a protocol stack. For example, processors of the baseband circuitry 204, alone or in combination, may be used execute Layer 3, Layer 2, or Layer 1 functionality, while processors of the application circuitry 204 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

The present disclosure considers a non-public network (NPN), which can be a self-contained network or interworking with one or more service networks (which may be operated by one or more mobile network operators (MNO)s providing PLMN services or third-party service network operators (SNO)). As used herein, a "type-a network" may refer to a 3GPP network that is not for public use and for which service continuity and roaming with a public PLMN is possible, and a "type-b network" may refer to an isolated 3GPP network that does not interact with a public PLMN. The type-a and type-b networks may be considered "non-public" because they may be accessed only by UEs with appropriate NPN configuration information as described herein.

Aspects of the present disclosure may provide solutions to the following issues that arise in the context of type-a and type-b networks: (1) Type-a and type-b network subscriptions; (2) How information identifying a type-a or type-b network is provided to the UE for network discovery and selection; (3) Which criteria are used by the UE for automatic selection of type-a or type-b networks; (4) How to support manual selection of type-a and type-b networks; (5) How to prevent UEs not authorized for a given type-a or type-b network from attempting to automatically select and register in that type-a or type-b network; (6) How to enable the network to verify whether a UE is authorized to access a type-a or type-b network; (7) Which network entities perform access control for type-a and type-b networks; (8) Access barring aspects for type-a and type-b networks; (9) Where access restrictions are configured (e.g. subscription or configuration); (10) How to enable UEs to access type-b networks but prevent the same UEs from accessing public PLMNs; (11) How to prevent UEs not supporting type-a and type-b networks from attempting to access type-a and type-b networks; (12) How to prevent NG-RAN from handing over a UE to a type-a network if the UE is not permitted to access the type-a network; (13) What are the information elements included in the network identification and what is the granularity of each information, e.g. network operator identifier, type of the network, location information; (14) Whether and how to provide differentiation between type-a and type-b network in a network identification; (15) What are the assumption on the uniqueness of the network identification; and/or (16) Whether and how is the network identification related to the UE identification.

Current solutions include some studies in MulteFire, which may provide the methods for interworking a MulteFire network with LTE+EPC. However, some of the issues indicated above have not been resolved yet in these solutions, and the methods used for EPS may not be applicable for 5GS. In contrast, the embodiments herein may provide comprehensive solutions in support of different deployment options for enabling services in PLMN domain or vertical domain for the 5GS UE capable of type-a/type-b network communication. Further, the present disclosure provides mechanisms to resolve the abovementioned open issues for network identification, network discovery and selection, as well as the access control. In support of type-a/type-b network access for a UE, embodiments include a set of UE configuration parameters in type-a/type-b network service profile, and design principles for type-a/type-b network identification and service network identification which can be used for the UE to perform PLMN selection, network discovery and selection based on configured type-a/type-b network service profile.

For purposes of the present disclosure, for type-a networks, the interworking service networks (e.g., service networks 332, 334 of FIG. 3) are 5GS PLMNs. The interworking system architecture may be of another type, however. In some cases, the fundamental system architecture and UE Configuration Update procedure is assumed to supported and used in a NPN according to 3GPP TS 23.501, 502, and 503.

Figure 3:
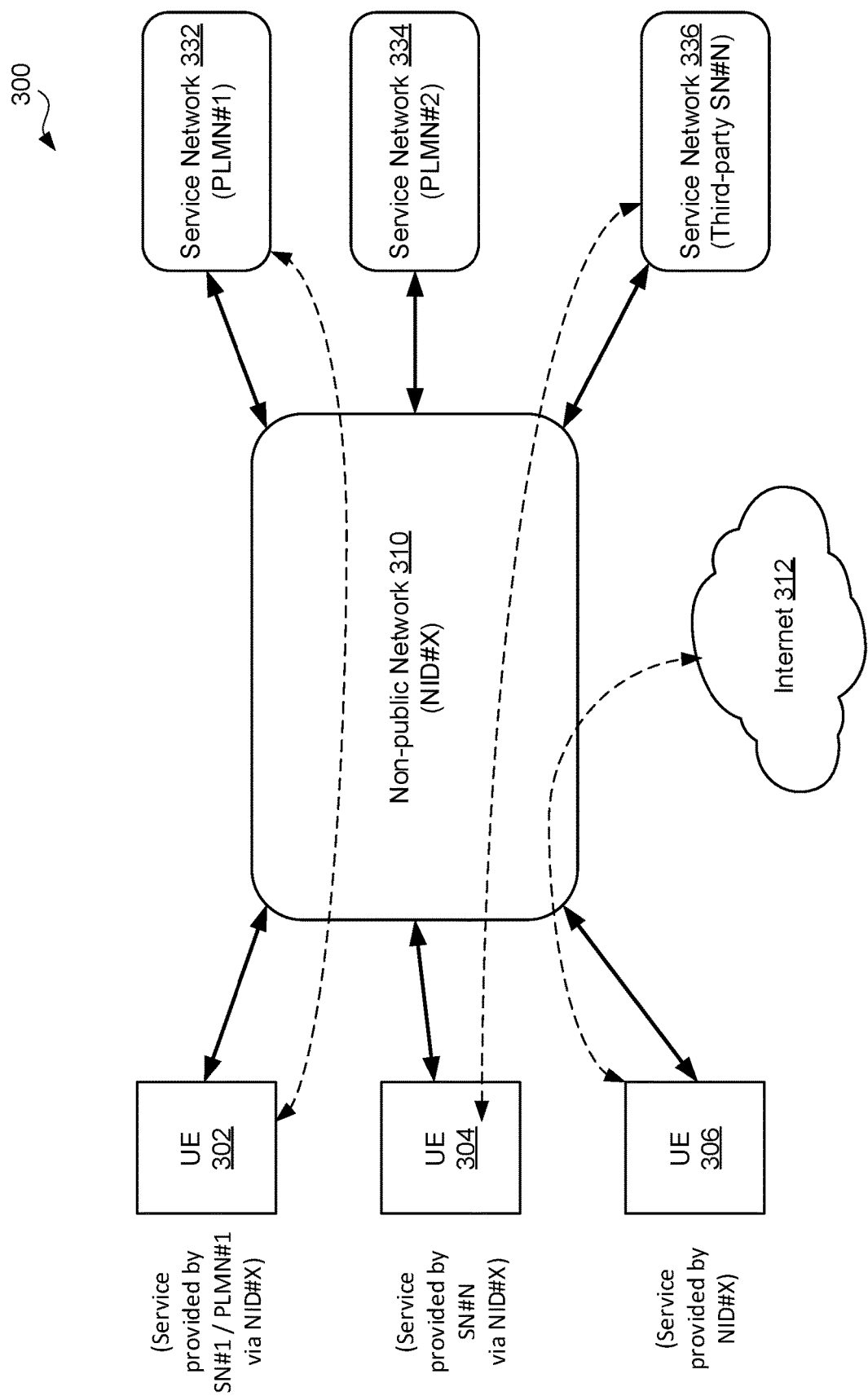
FIG. 3 is a diagram showing example user equipment (UE) connected to a non-public network in accordance with some embodiments.

FIG. 3 is a diagram showing example user equipment (UE) 302, 304, 306 connected to a non-public network (NPN) 310 in accordance with some embodiments. In particular, FIG. 3 shows an example NPN and various use cases, such as where the NPN is a self-contained network (e.g., for UE 306) or the case where the NPN provides interaction with external service networks (e.g., for UEs 302, 304). In the example shown, the UEs may access local/non-public network services (e.g., Internet 312) via the NPN 310, or may access external services (e.g., through service networks 332, 334, 336) via the NPN 310. The service networks 332, 334, 336 may be third-party networks, and in some cases, may be public land mobile networks (PLMNs) that provide mobile cellular services according to the 3GPP TR 21.905.

From the UE point of view, the major difference between the type-a and type-b networks is whether the UE is authorized to use services provided by the PLMN via the registered NPN 310. That is, if the UE is not authorized to use services provided by any PLMNs, the UE is registered to a type-b network. On the other hand, an NPN 310 may support services provided by one or more service network providers which can include MNOs. That is, in some cases, the NPN 310 can be both of type-a and type-b. For the UE, it actually selects a service network which can provide authorized services via a selected NPN 310.

As shown in FIG. 3, for UE 302, UE 304, and UE 306, each can register to the same NPN 310 identified as NID #X. However, logically: (1) the UE 302 is registered to a type-a network if it is authorized to use the service provided by a PLMN #1; (2) the UE 304 is registered to a type-b network if it is not authorized to use any service provided by any PLMNs, e.g. SN #N; (3) the UE 306 registers to a self-contained type-b network which provides local, non-public network services without any interaction to external service networks.

Certain deployment options of NPN 310 may include: (1) NPN 310 is a type-a network which provides PLMN service by operating as a RAN node in the PLMN; (2) NPN 310 is a type-a network which provides non-public network services and PLMN services by interworking with one or more PLMNs; (3) NPN 310 provide is a type-b network which provides Non-PLMN services by interworking with one or more service network; or (4) NPN 310 is a self-contained type-b network which provides local PLMN or Non-PLMN services (also referred to herein as non-public network services) without any interaction to external service networks. Deployment option 1 above may be referred to as a non-standalone case, whereas deployment options 2-4 above may be referred to as standalone cases.

Embodiments herein provide mechanisms for UEs to access an NPN using the following principles for NPN identification: (1) the NPN may be able to support type-a and/or type-b and both may have the same format of the network identification, defined as NID; (2) NID of the NPN may be able to indicate the support of external service network, e.g. SN #1, . . . , SN #N, or non-public network service, e.g. as a self-contained private network; (3) the NPN may provide information of the supported external service network, e.g. SN #1, SN #N, which can be identified by a service network identification, defined as SN-ID; (4) SN-ID of the service network may be able to indicate the support of MNO which is with the format of PLMN-ID (e.g., indicating a mobile country code (MCC) and mobile network code (MNC)), and other Service Network Operators (SNO) which format is FFS; (5) the RAN node in the NPN may broadcast the following information: (a) NID; and/or (b) Supported SN-IDs list; (6) the UE may be configured with the following information in NPN profile: (a) SN-IDs list in priority order; (b) Authentication parameters including credential, authentication method of the configured SN-ID; and/or (c) DNN, S-NSSAI, SSC mode of the configured SN-ID.

For a UE configured with an NPN profile, it may be important that NPN discovery and selection is able to be compatible with existing PLMN selection procedure as in 3GPP TS 23.122/TS 36.304. For example, when a UE is switched on, a PLMN is selected by NAS, and on request of the NAS, the AS may perform a search for available PLMNs with CN type if available for each PLMN and report them to NAS. Thus, a UE may need to be able to select a PLMN-ID that is used for the NPN, and the NPN selection procedure may need to be able to provide information for the UE to differentiate if external services are provided via a service network or non-public network service is supported.

Embodiments herein provide mechanisms for UEs to access an NPN using the following principles for NPN discovery and selection. In the PLMN selection procedure, a reserved global unique PLMN-ID may be used for an NPN as an indication to differentiate access network between the 3GPP Network and NPN. The RAN nodes in NPN may broadcast the reserved global unique PLMN-ID along with other supported PLMNs, if available, in the system information. As a part of the configuration of the NPN Profile, the UE may be also configured with the following information: the Reserved PLMN-ID to be used in PLMN selection. For the UE configured with NPN profile, when it detects and selects the reserved PLMN-ID, it continues with NPN Discovery and Selection procedure. For the NPN selection procedure, if external services are supported, NPN selection can base on the information with combination of SNID+NID, and if non-public network services are supported, NPN selection can only be based on NID.

In some cases, the following two options can be further considered for the UE to differentiate the type of NPN. First (option 1), two different reserved PLMN-IDs may be allocated to represent two types of NPN selection procedure, for either external service or non-public network service. Second (option 2), NID contains an indication which is used to differentiate if associated service is provided by the external service network or non-public network service network.

Embodiments herein provide mechanisms for UEs to access an NPN using access class information may be stored in USIM or as a part of the configuration of the NPN Profile.

The UE may be also configured with the access class information corresponding to the configured SN-ID. Access control of the NPN may be based on the RAN node of the NPN broadcasting information of the allow/non-allowed access class of the Service Network identified by the SN-ID.

Figure 4A:
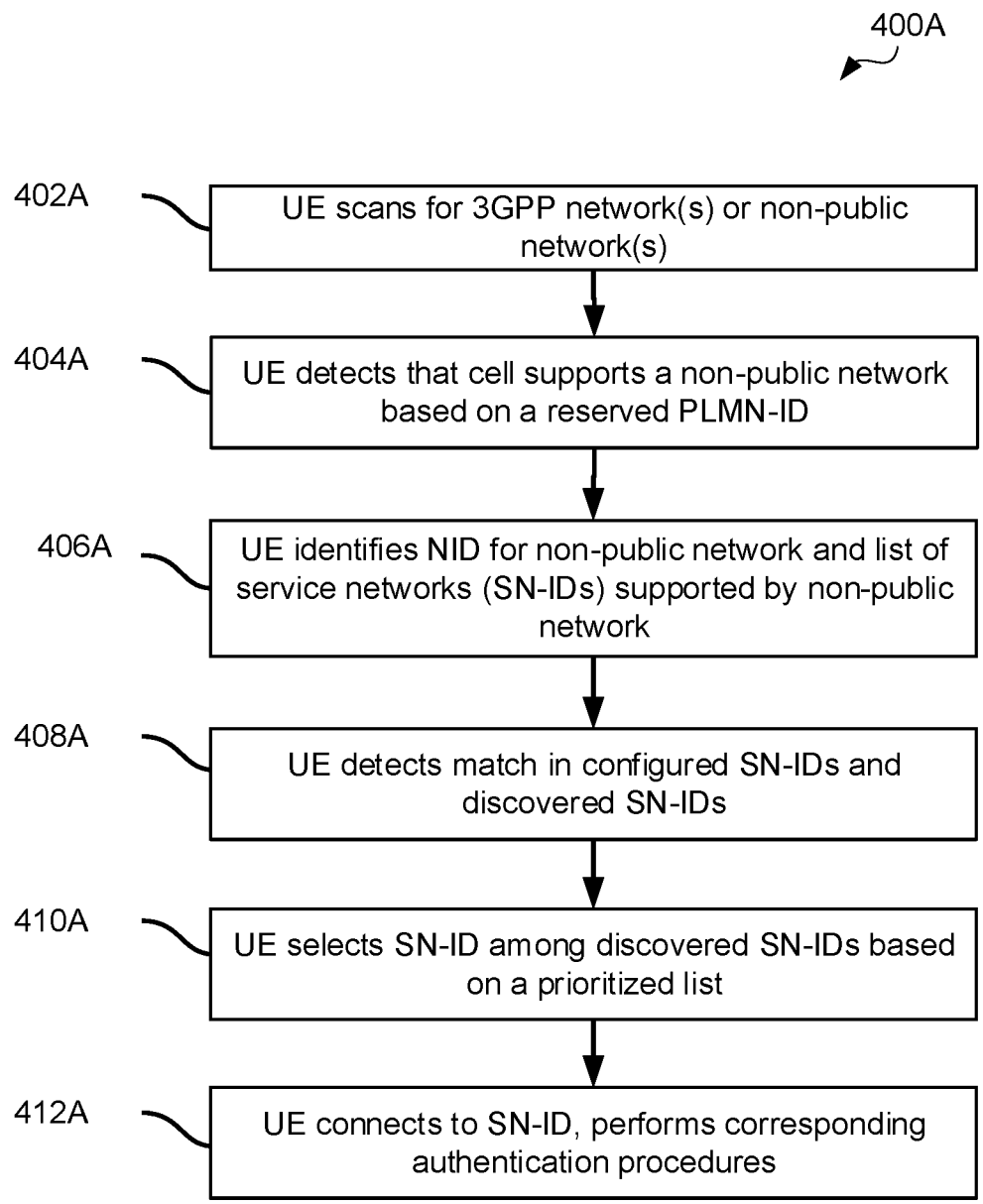
FIGS. 4A-4C are flow diagrams showing example processes of NPN discovery and selection in accordance with some embodiments.
Figure 4B:
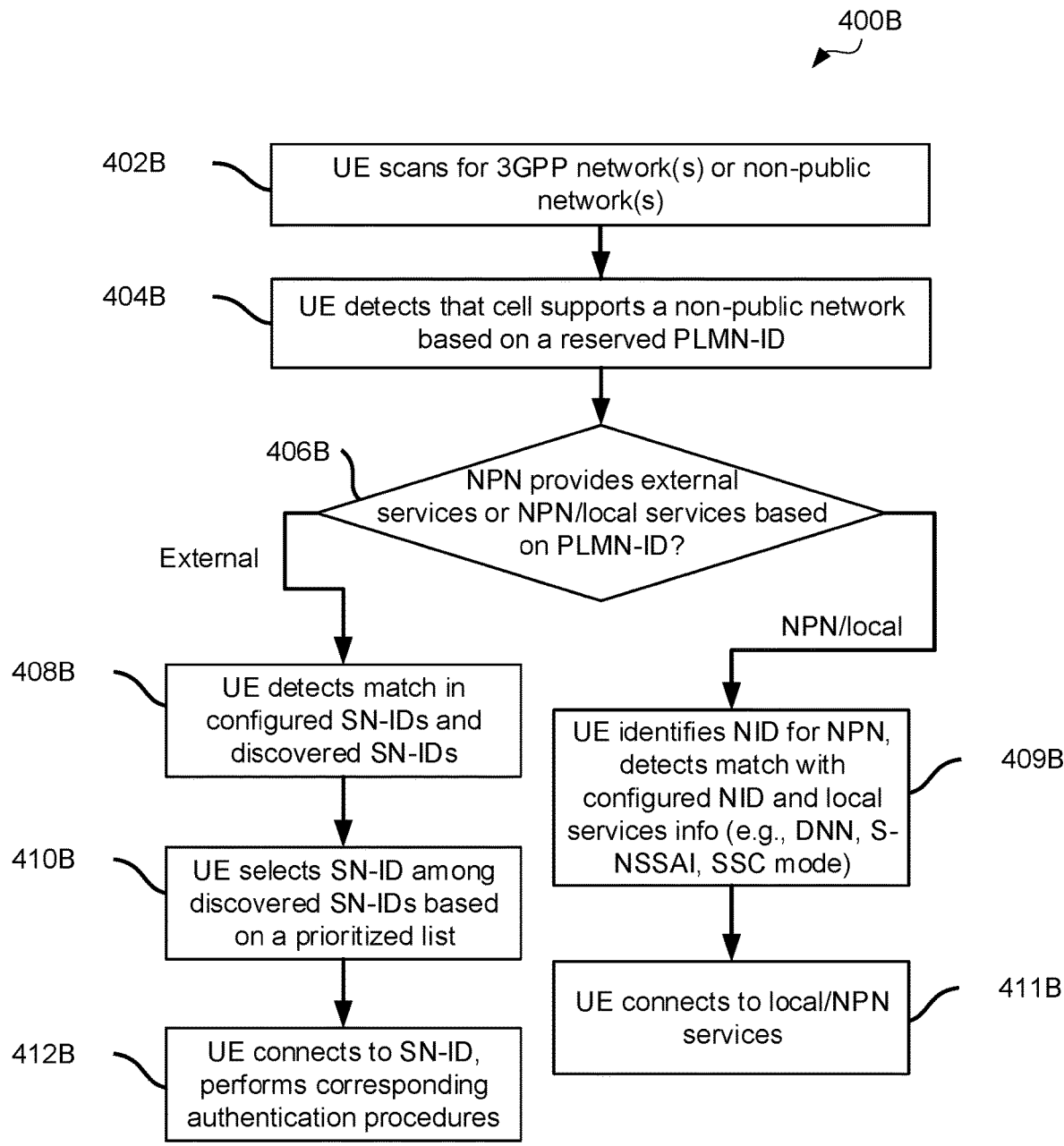
Figure 4C:
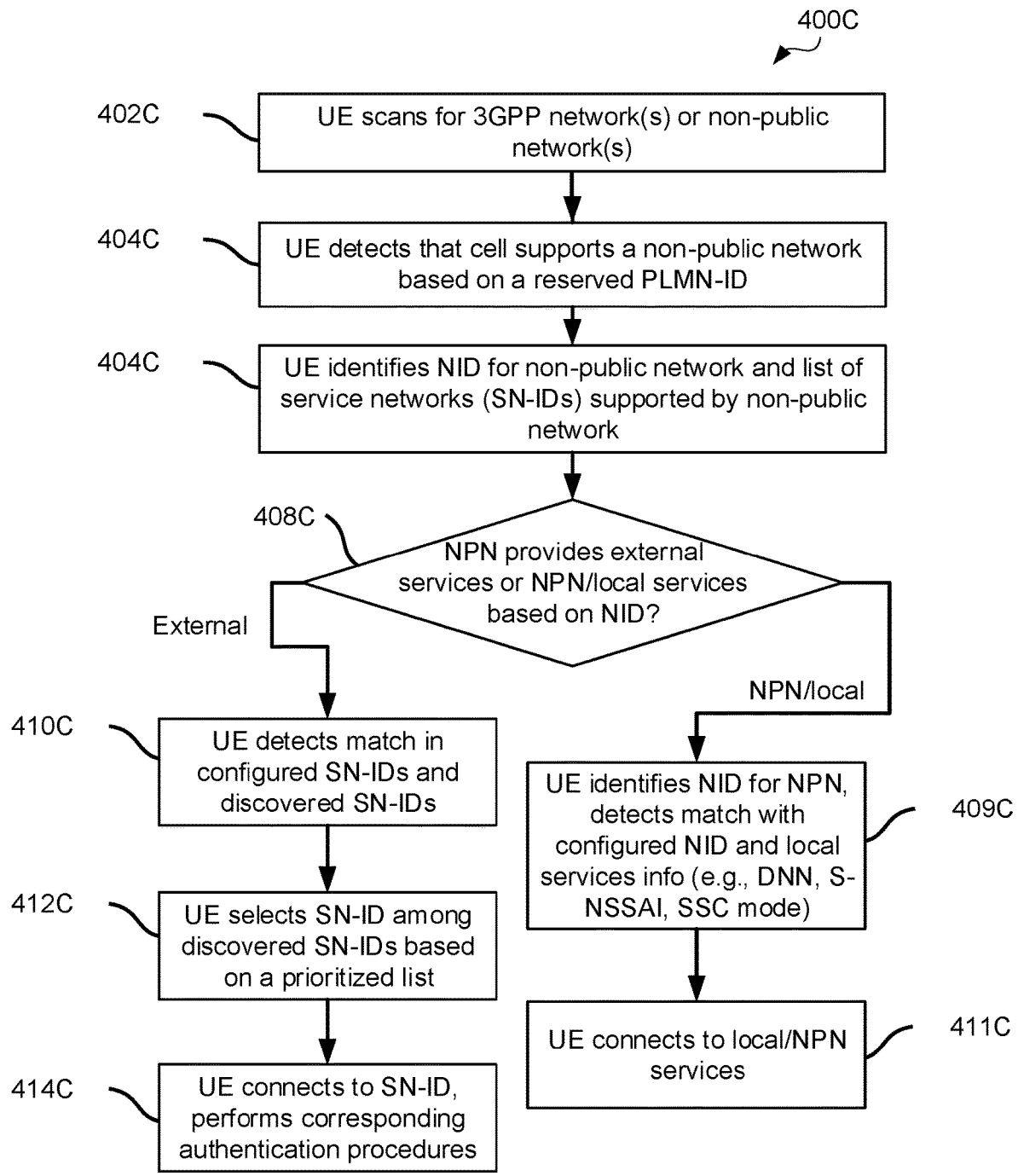

FIGS. 4A-4C are flow diagrams showing example processes 400 of NPN discovery and selection in accordance with some embodiments. Operations in the example process 400 may be performed by one or more components of a UE device (e.g., one or more components the baseband circuitry 204 of FIG. 2), and, in certain cases, may be encoded in computer-readable media as instructions executable by processing circuitry of at least one processor. The example processes 400 may include additional or different operations, and the operations may be performed in the order shown or in another order. In some cases, one or more of the operations shown in FIGS. 4A-4C are implemented as processes that include multiple operations, sub-processes, or other types of routines. In some cases, operations can be combined, performed in another order, performed in parallel, iterated, or otherwise repeated or performed another manner.

In one embodiment (embodiment 4.1, shown in FIG. 4A), the following example procedure may be used for discovery of a NPN with external service support. A UE autonomously scans applicable frequency bands for cells of 3GPP Network(s) and NPN(s) at 402A, detects that a cell supports a NPN based on the reserved PLMN-ID (broadcast by the cell) at 404A, and identifies the NID and the list of service networks (e.g., SN-IDs) supported by the NPN identified by NID at 406A. For the NPN Selection, the example procedure may be used. The UE detects a match between configured SN-IDs and available SN-IDs at 408A, selects the SN-ID among the discovered SN-IDs based on the prioritized list of configured SN-IDs at 410A, connects to a NID serving the Service Network identified as SN-ID and performs corresponding authentication procedures at 412A.

In another embodiment (embodiment 4.2, shown in FIG. 4B): for NPN Discovery where different reserved PLMN-IDs indicate support of non-public network service or external service in NPN), the following example procedure may be used. The UE autonomously scans applicable frequency bands for cells of 3GPP Network(s) and NPN(s) at 402B, and detects that a cell supports NPN based on the reserved PLMN-ID (broadcast by the cell) at 404B. Based on the reserved PLMN-ID, the UE determines at 406B if the detected NPN provides external services or non-public network services. If the reserved PLMN-ID indicates external services are provided by the NPN, the UE performs NPN discovery steps 408B, 410B, 412B (the same as steps 408A, 410A, 412A, respectively, described above with respect to Embodiment 4.1). If, however, the reserved PLMN-ID indicates the NPN provides local, non-public network services, the UE may identify the NID and detect a match between a configured NID for the UE and optional configured non-public network service information (e.g. DNN, S-NSSAI, SSC mode, etc.) at 409B, and connects to the local/NPN services at 411B.

In another embodiment (embodiment 4.3, shown in FIG. 4C), for NPN Discovery where a bit (e.g., first bit) in NID indicates the support of non-public network service or external service in NPN), the following example procedure may be used. The UE autonomously scans applicable frequency bands for cells of 3GPP Network(s) and NPN(s) at 402C, detects that a cell supports NPN based on the reserved PLMN-ID at 404C, and identifies the NID and the list of SN-IDs supported by the NPN identified by NID at 406C. Based on the first bit of the NID, UE determines at 408C whether the NPN provides external services or local/non-public network services. If NID indicates support for external service, the UE performs NPN discovery steps 410C, 412C, 414C (the same as steps 408A, 410A, 412A, respectively, described above with respect to Embodiment 4.1). If, however, NID indicates support for non-public network services, the UE may identify the NID (skipping the detection of SN-IDs list and NPN selection procedure) at 409C, detect a match between configured NID and optional configured non-public network service information (e.g. DNN, S-NSSAI, SSC mode, etc.) at 411C, and connect to the local/NPN services at 411C.

In some embodiments, the UE Configuration in NPN profile includes the indication for NPN deployment option 1 described above (the non-standalone case), or deployment options 2, 3, or 4, which indicates the which NPN deployment option is enabled. If deployment option 2, 3, or 4 are enabled, the UE may follows the procedures described above to perform PLMN selection, and NPN discovery/selection. If deployment option 1 is enabled, loose coupling to a NR-RAN node may also be supported, which may require enhanced features for the RAN node in NPN. In this case, the differentiation of the NPN RAN node (referred to herein as a NPN-RAN node) and other NR-RAN nodes is needed. In some cases, the UE may be able to determine whether a detected Cell-ID of NPN-RAN node is NPN. Thus, a new NPN-Cell-ID may be designed as follows (e.g., as additions to TS 38.413). The NPN may be a new category in NR-RAN-Node and the first [X] bits (e.g., the first bit) of the NPN-Cell-ID may indicate the NPN-RAN-Node ID. The UE NPN configuration profile can include one or more NPN-RAN-Node IDs supported by the UE. The UE may perform PLMN selection and select a cell which matches configured NPN-RAN-Node IDs.

In some embodiments, the NPN may use a UE Configuration Update procedure as described in TS 23.501 or 23.502 to configure NPN Profile configuration information for the UE with the following parameters. In some cases, The UE NPN configuration profile includes an indication of network deployment options (e.g. deployment option 1 (NPN interworks as a RAN node, type-a network), or Options 2, 3, or 4 (NPN with self-contained service or external services). In cases where deployment option 1 is indicated, the UE NPN configuration profile may include a set of NR-RAN-Node IDs supported by the UE. In cases where deployment options 2, 3, or 4 are indicated, the UE NPN configuration profile may include one or more of: a reserved global unique PLMN-ID and a list of SN-IDs in priority order. For each SN-ID in the configured SN-IDs list, the following parameters may be provided: authentication parameters (e.g., including credentials or authentication methods/procedures), Access Class information, local service information (e.g., DNN, S-NSSAI, SSC mode if network slicing is supported in Service network), or Service Network type (e.g., IMS, 5GS, EPS).

Functions, operations, components and/or features described herein with reference to one or more embodiments, may be combined with, or may be utilized in combination with, one or more other functions, operations, components and/or features described herein with reference to one or more other embodiments, or vice versa.

EXAMPLES

The following examples pertain to further embodiments. It will be understood that certain examples listed below may be combined with other examples, or certain aspects of other examples. The examples listed below may be or implemented in or performed by one or more components of a User Equipment (UE) device (e.g., one or more components the baseband circuitry 204 of FIG. 2 implemented in a UE device).

Example 1 includes an apparatus of a User Equipment (UE) device, the apparatus comprising: memory storing non-public network (NPN) configuration information; a radio frequency (RF) interface to receive information broadcast by a radio access network (RAN) node of a particular NPN, the information comprising a NPN indicator indicating that the RAN node supports a NPN and NPN service information indicating services supported by the particular NPN; and processing circuitry coupled to the memory and the RF interface, the processing circuitry to establish, in response to detecting the NPN indicator in the information received from the RAN node, a connection to the particular NPN based on the NPN configuration information and the NPN service information received from the RAN node.

Example 2 may include the subject matter of Example 1, and optionally, wherein the NPN indicator is a reserved public land mobile network identifier (PLMN-ID) for use by any RAN node to indicate that the RAN node supports a NPN.

Example 3 may include the subject matter of Example 1, and optionally, wherein the NPN configuration information indicates a network identifier (NID) supported by the UE device, the information broadcast by the RAN node further comprises a NID for the particular NPN, and the processing circuitry is to establish the connection to the particular NPN based on detecting that the NID in the NPN configuration information matches the NID for the particular NPN.

Example 4 may include the subject matter of Example 3, and optionally, wherein the NID indicates that the particular NPN does not support external services.

Example 5 may include the subject matter of Example 1, and optionally, wherein the NPN indicator further indicates that the particular NPN does not support external services.

Example 6 may include the subject matter of any one of Examples 1-5, and optionally, wherein the NPN configuration information further comprises local service information comprising one or more of a Data Network Name (DNN), Single Network Slice Selection Assistance Information (S-NSSAI), and Session and Service Continuity (SSC) mode information, and the processing circuitry is to establish the connection to the particular NPN based on detecting that the local service information matches at least part of the NPN service information.

Example 7 may include the subject matter of Example 1, and optionally, wherein the NPN service information comprises a set of service network identifiers (SN-IDs) for respective external service networks (SNs) supported by the particular NPN.

Example 8 may include the subject matter of Example 7, and optionally, wherein at least one of the external SNs supported by the particular NPN is a public land mobile network (PLMN) provided by a mobile network operator (MNO), and the SN-ID corresponding to the PLMN provided by the MNO is an identifier for the MNO, the identifier for the MNO comprising a Mobile Country Code (MCC) and a Mobile Network Code (MNC).

Example 9 may include the subject matter of Example 7, and optionally, wherein at least one of the external SNs supported by the particular NPN is a third-party service, and the SN-ID corresponding to the third-party service is a domain name for the third-party service.

Example 10 may include the subject matter of any one of Examples 7-9, and optionally, wherein the NPN configuration information comprises a set of SN-IDs for service networks supported by the UE device, and the processing circuitry is to establish the connection to the particular NPN based on detecting that a SN-ID in the NPN service information matches a SN-ID in the NPN configuration information.

Example 11 may include the subject matter of Example 10, and optionally, wherein the NPN configuration indicates a respective priority for each SN-IDs, and the processing circuitry is to establish the connection to the particular NPN further based on the priorities of the SN-IDs.

Example 12 may include the subject matter of Example 10, and optionally, wherein the NPN configuration information further comprises, for at least one of the SN-IDs, authentication information comprising one or more of credentials and an authentication process corresponding to the SN-ID.

Example 13 may include the subject matter of Example 10, and optionally, wherein the NPN configuration information further comprises access class information for at least one of the SN-IDs, the information broadcast by the RAN node further comprises access class information allowed or non-allowed access classes for at least one SN-ID, and the processing circuitry is to establish the connection to the particular NPN further based on the access class information in the NPN configuration information and the access class information in the information broadcast by the RAN node.

Example 14 may include the subject matter of Example 1, and optionally, wherein the NPN configuration information indicates network deployment information for an NPN supported by the UE device, the network deployment information indicating whether the NPN is a standalone or non-standalone deployment.

Example 15 may include the subject matter of Example 14, and optionally, wherein the network deployment information indicates a non-standalone NPN deployment, and the NPN configuration information indicates identifiers for NPN RAN nodes supported by the UE device.

Example 16 may include the subject matter of any preceding Example, and optionally, further comprising a front-end module coupled to the processing circuitry.

Example 17 may include the subject matter of Example 16, and optionally, further comprising at least one antenna coupled to the front-end module.

Example 18 includes a method to be performed at a processing circuitry of a User Equipment (UE) device, the method comprising: obtaining information broadcast by a radio access network (RAN) node of a particular non-public network (NPN), the information comprising a NPN indicator indicating that the RAN node supports a NPN and NPN service information indicating services supported by the particular NPN; and establishing, in response to detection of the NPN indicator in the information broadcast by the RAN node, a connection to the particular NPN based on the NPN service information and NPN configuration information for the UE device indicating support for the particular NPN.

Example 19 may include the subject matter of Example 18, and optionally, wherein the NPN indicator is a reserved public land mobile network identifier (PLMN-ID) for use by any RAN node to indicate that the RAN node supports a NPN.

Example 20 may include the subject matter of Example 18, and optionally, wherein the NPN configuration information indicates a network identifier (NID) supported by the UE device, the information broadcast by the RAN node further comprises a NID for the particular NPN, and establishing the connection to the particular NPN is based on detecting that the NID in the NPN configuration information matches the NID for the particular NPN.

Example 21 may include the subject matter of Example 20, and optionally, wherein the NID indicates that the particular NPN does not support external services.

Example 22 may include the subject matter of Example 18, and optionally, wherein the NPN indicator further indicates that the particular NPN does not support external services.

Example 23 may include the subject matter of any one of Examples 18-22, and optionally, wherein the NPN configuration information further comprises local service information comprising one or more of a Data Network Name (DNN), Single Network Slice Selection Assistance Information (S-NSSAI), and Session and Service Continuity (SSC) mode information, and establishing the connection to the particular NPN is based on detecting that the local service information matches at least part of the NPN service information.

Example 24 may include the subject matter of Example 18, and optionally, wherein the NPN service information comprises a set of service network identifiers (SN-IDs) for respective external service networks (SNs) supported by the particular NPN.

Example 25 may include the subject matter of Example 24, and optionally, wherein at least one of the external SNs supported by the particular NPN is a public land mobile network (PLMN) provided by a mobile network operator (MNO), and the SN-ID corresponding to the PLMN provided by the MNO is an identifier for the MNO, the identifier for the MNO comprising a Mobile Country Code (MCC) and a Mobile Network Code (MNC).

Example 26 may include the subject matter of Example 24, and optionally, wherein at least one of the external SNs supported by the particular NPN is a third-party service, and the SN-ID corresponding to the third-party service is a domain name for the third-party service.

Example 27 may include the subject matter of any one of Examples 24-26, and optionally, wherein the NPN configuration information comprises a set of SN-IDs for service networks supported by the UE device, and establishing the connection to the particular NPN is based on detecting that a SN-ID in the NPN service information matches a SN-ID in the NPN configuration information.

Example 28 may include the subject matter of Example 27, and optionally, wherein the NPN configuration indicates a respective priority for each SN-IDs, and establishing the connection to the particular NPN further based on the priorities of the SN-IDs.

Example 29 may include the subject matter of Example 27, and optionally, wherein the NPN configuration information further comprises, for at least one of the SN-IDs, authentication information comprising one or more of credentials and an authentication process corresponding to the SN-ID.

Example 30 may include the subject matter of Example 27, and optionally, wherein the NPN configuration information further comprises access class information for at least one of the SN-IDs, the information broadcast by the RAN node further comprises access class information allowed or non-allowed access classes for at least one SN-ID, and establishing the connection to the particular NPN is further based on the access class information in the NPN configuration information and the access class information in the information broadcast by the RAN node.

Example 31 may include the subject matter of Example 18, and optionally, wherein the NPN configuration information indicates network deployment information for an NPN supported by the UE device, the network deployment information indicating whether the NPN is a standalone or non-standalone deployment.

Example 32 may include the subject matter of Example 31, and optionally, wherein the network deployment information indicates a non-standalone NPN deployment, and the NPN configuration information indicates identifiers for NPN RAN nodes supported by the UE device.

Example 33 includes a product comprising one or more tangible computer-readable non-transitory storage media comprising computer-executable instructions operable to, when executed by at least one computer processor, enable the at least one computer processor to perform the method of any one of claims 18-32.

Example 34 includes a system comprising means for establishing a connection between a User Equipment (UE) device and a non-public network (NPN) based on NPN configuration information stored on the UE device and NPN service information broadcast by a radio access node (RAN) of the NPN indicating services supported by the NPN.

Example 35 may include a device comprising logic, modules, or circuitry to perform one or more elements of a method described in or related to any of the examples above or any other method or process described herein.

Example 36 may include a signal as described in or related to any of the Examples above, or portions or parts thereof.

Example 37 may include a signal in a wireless network as shown and described herein.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. A User Equipment (UE), the UE comprising:
   memory storing non-public network (NPN) configuration information;
   a radio frequency (RF) interface to receive information broadcast by a radio access network (RAN) node of a particular NPN, the information comprising a NPN indicator indicating that the RAN node supports a NPN and NPN service information indicating services supported by the particular NPN; and
   processing circuitry coupled to the memory and the RF interface, the processing circuitry to establish, in response to detecting the NPN indicator in the information received from the RAN node, a connection to the particular NPN based on the NPN configuration information and the NPN service information received from the RAN node, wherein the NPN indicator is a reserved public land mobile network identifier (PLMN-ID) for use by any RAN node to indicate that the RAN node supports a NPN.

2. The UE of claim 1, wherein the NPN configuration information indicates a network identifier (NID) supported by the UE device, the information broadcast by the RAN node further comprises a NID for the particular NPN, and the processing circuitry is to establish the connection to the particular NPN based on detecting that the NID in the NPN configuration information matches the NID for the particular NPN.

3. The UE of claim 2, wherein the NID indicates that the particular NPN does not support external services.

4. The UE of claim 1, wherein the NPN indicator u ther indicates that the particular NPN does not support external services.

5. The UE of claim 1, wherein the NPN configuration information further comprises local service information comprising one or more of a Data Network Name (DNN), Single Network Slice Selection Assistance Information (S-NSSAI), and Session and Service Continuity (SSC) mode information, and the processing circuitry is to establish the connection to the particular NPN based on detecting that the local service information matches at least part of the NPN service information.

6. The UE of claim 1, wherein the NPN service information comprises a set of service network identifiers (SN-IDs) for respective external service networks (SNs) supported by the particular NPN.

7. The UE of claim 6, wherein at least one of the external SNs supported by the particular NPN is a public land mobile network (PLMN) provided by a mobile network operator (MNO), and an SN-ID corresponding to the PLMN provided by the MNO is an identifier for the MNO, the identifier for the MNO comprising a Mobile Country Code (MCC) and a Mobile Network Code (MNC).

8. The UE of claim 6, wherein at least one of the external SNs supported by the particular NPN is a third-party service, and the SN-ID corresponding to the third-party service is a domain name for the third-party service.

9. The UE of claim 6, wherein the NPN configuration information comprises a set of SN-IDs for service networks supported by the UE device, and the processing circuitry is to establish the connection to the particular NPN based on detecting that a SN-ID in the NPN service information matches a SN-ID in the NPN configuration information.

10. The UE of claim 9, wherein the NPN configuration indicates a respective priority for each SN-ID, and the processing circuitry is to establish the connection to the particular NPN further based on the priorities of the SN-IDs.

11. The UE of claim 9, wherein the NPN configuration information further comprises access class information for at least one of the SN-IDs, the information broadcast by the RAN node further comprises access class information for allowed or non-allowed access classes for at least one SN-ID, and the processing circuitry is to establish the connection to the particular NPN further based on the access class information in the NPN configuration information and the access class information in the information broadcast by the RAN node.

12. The UE of claim 1, wherein the NPN configuration information indicates network deployment information for an NPN supported by the UE device, the network deployment information indicating whether the NPN is a standalone or non-standalone deployment.

13. The UE of claim 12, wherein the network deployment information indicates a non-standalone NPN deployment, and the NPN configuration information indicates identifiers for NPN RAN nodes supported by the UE device.

14. A method to be performed at a processing circuitry of a User Equipment (UE) device, the method comprising:
obtaining information broadcast by a radio access network (RAN) node of a particular non-public network (NPN), the information comprising a NPN indicator indicating that the RAN node supports a NPN and NPN service information indicating services supported by the particular NPN; and
establishing, in response to detection of the NPN indicator in the information broadcast by the RAN node, a connection to the particular NPN based on the NPN service information and NPN configuration information for the UE device indicating support for the particular NPN, wherein the NPN indicator is a reserved public land mobile network identifier (PLMN-ID) for use by any RAN node to indicate that the RAN node supports a NPN.

15. The method of claim 14, wherein the NPN configuration information for the UE device indicates a network identifier (NID) supported by the UE device, the information broadcast by the RAN node further comprises a NID for the particular NPN, and establishing the connection to the particular NPN is based on detecting that the NID in the NPN configuration information matches the NID for the particular NPN.

16. The method of claim 14, wherein the NPN configuration information further comprises local service information comprising one or more of a Data Network Name (DNN), Single Network Slice Selection Assistance Information (S-NSSAI), and Session and Service Continuity (SSC) mode information, and establishing the connection to the particular NPN is based on detecting that the local service information matches at least part of the NPN service information.

17. The method of claim 14, wherein the NPN service information comprises a set of service network identifiers (SN-IDs) for respective external service networks (SNs) supported by the particular NPN, and an external SN supported by the particular NPN is one or more of: a public land mobile network (PLMN) provided by a mobile network operator (MNO), and the SN-ID corresponding to the PLMN provided by the MNO is an identifier for the MNO, the identifier for the MNO comprising a Mobile Country Code (MCC) and a Mobile Network Code (MNC); and
a third-party service, and the SN-ID corresponding to the third-party service is a domain name for the third-party service.

18. The method of claim 17, wherein the NPN configuration information comprises a set of SN-lDs for service networks supported by the UE device, and establishing the connection to the particular NPN is based on detecting that a SN-ID in the NPN service information matches a SN-ID in the NPN configuration information.

19. The method of claim 18, wherein the NPN configuration information further comprises access class information for at least one of the SN-IDs, the information broadcast by the RAN node further comprises access class information for allowed or non-allowed access classes for at least one SN-ID, and establishing the connection to the particular NPN is further based on the access class information in the NPN configuration information and the access class information in the information broadcast by the RAN node.

20. A baseband processor, the baseband processor comprising:
processing circuitry configured to:
receive information broadcast by a radio access network (RAN) node of a particular NPN, the information comprising a NPN indicator indicating that the RAN node supports a NPN and NPN service information indicating services supported by the particular NPN; and
establish, in response to detecting the NPN indicator in the information received from the RAN node, a connection to the particular NPN based on stored NPN configuration information and the NPN service information received from the RAN node, wherein the NPN indicator is a reserved public land mobile network identifier (PLMN-ID) for use by any RAN node to indicate that the RAN node supports a NPN.

* * * * *